US009292079B2

(12) United States Patent
Bose et al.

(10) Patent No.: US 9,292,079 B2
(45) Date of Patent: *Mar. 22, 2016

(54) ACCELERATING THE MICROPROCESSOR CORE WAKEUP BY PREDICTIVELY EXECUTING A SUBSET OF THE POWER-UP SEQUENCE

(71) Applicant: International Business Machines Corporation, Armonk, NY (US)

(72) Inventors: Pradip Bose, Yorktown Heights, NY (US); Alper Buyuktosunoglu, White Plains, NY (US); Hans Jacobson, White Plains, NY (US); Victor Zyuban, Yorktown Heights, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 139 days.

This patent is subject to a terminal disclaimer.

(21) Appl. No.: 14/171,899

(22) Filed: Feb. 4, 2014

(65) Prior Publication Data

US 2015/0082066 A1    Mar. 19, 2015

Related U.S. Application Data

(63) Continuation of application No. 14/026,472, filed on Sep. 13, 2013.

(51) Int. Cl.
  *G06F 1/00* (2006.01)
  *G06F 1/32* (2006.01)
  *G06F 1/26* (2006.01)

(52) U.S. Cl.
  CPC .............. *G06F 1/3287* (2013.01); *G06F 1/26* (2013.01)

(58) Field of Classification Search
  CPC .................................................. G06F 1/3203
  USPC ........................................................ 713/323
  See application file for complete search history.

(56) References Cited

U.S. PATENT DOCUMENTS 5,457,421 A    10/1995  Tanabe
5,504,909 A *  4/1996   Webster et al. ............... 713/310
(Continued)

FOREIGN PATENT DOCUMENTS

CN       101004630 A    7/2007
EP        1037366 A2    9/2000
(Continued)

OTHER PUBLICATIONS

Kawaskaki et al. "A Sub- μs Wake-up Time Power Gating Technique with Bypass Power Line for Rush Current Support," Fujitsu Laboratories Ltd., 2008 Symposium on VLSI Circuits Digest of Technical Papers, 978-1-4244-1805-3/08, IEEE, 2 pages.
(Continued)

*Primary Examiner* — Suresh Suryawanshi
(74) *Attorney, Agent, or Firm* — Cantor Colburn LLP

(57) ABSTRACT

A mechanism is provided for an integrated circuit with power gating. A power header switch is configured to connect and disconnect any one of multiple circuits to a common voltage source, where a powered off circuit is disconnected from the common voltage source. A power-up sequencer includes an initial stages power-up component and a final stages power-up component. The final stages power-up component is configured to execute final stages of a power-up process for the powered off circuit, and the initial stages power-up component is configured to execute initial stages of the power-up process for the powered off circuit. The initial stages power-up component is activated in response to a predictive power-up request.

8 Claims, 6 Drawing Sheets

(56) References Cited

U.S. PATENT DOCUMENTS

| | | | |
|---|---|---|---|
| 6,721,885 B1 | 4/2004 | Freeman et al. | |
| 6,927,619 B1 | 8/2005 | Doyle | |
| 7,190,210 B2 | 3/2007 | Azrai et al. | |
| 7,639,041 B1 | 12/2009 | Perisetty | |
| 8,190,939 B2 | 5/2012 | Fields, Jr. et al. | |
| 8,327,163 B2* | 12/2012 | Chen | 713/300 |
| 8,519,772 B2* | 8/2013 | Chu et al. | 327/434 |
| 8,633,751 B2* | 1/2014 | Hegde | 327/198 |
| 2001/0033152 A1 | 10/2001 | Pohlman et al. | |
| 2002/0089382 A1 | 7/2002 | Yang | |
| 2003/0034792 A1 | 2/2003 | Ostrom et al. | |
| 2005/0007178 A1 | 1/2005 | Fahim | |
| 2005/0053228 A1 | 3/2005 | Mullins et al. | |
| 2005/0091629 A1 | 4/2005 | Eisenstadt et al. | |
| 2007/0001747 A1 | 1/2007 | Von Kaenel | |
| 2008/0155280 A1 | 6/2008 | Hacking et al. | |
| 2009/0235260 A1 | 9/2009 | Branover et al. | |
| 2010/0097129 A1 | 4/2010 | Itoh et al. | |
| 2010/0253244 A1 | 10/2010 | Snook et al. | |
| 2011/0198681 A1 | 8/2011 | Shukuri et al. | |
| 2011/0204724 A1 | 8/2011 | Verma et al. | |
| 2011/0221399 A1* | 9/2011 | Sawataishi et al. | 320/166 |
| 2012/0025953 A1 | 2/2012 | Swanson et al. | |
| 2013/0099570 A1* | 4/2013 | Manohar et al. | 307/38 |
| 2013/0198549 A1 | 8/2013 | Longnecker et al. | |
| 2014/0097702 A1 | 4/2014 | Upputuri et al. | |

FOREIGN PATENT DOCUMENTS

| | | |
|---|---|---|
| EP | 1318591 A2 | 11/2003 |
| EP | 2345969 A2 | 7/2011 |
| EP | 2424092 A1 | 2/2012 |
| WO | 03079417 A2 | 9/2003 |
| WO | 2005011260 A1 | 2/2005 |
| WO | 2005094523 A2 | 10/2005 |

OTHER PUBLICATIONS

Mark Lehn et al, "A 0.13—1-GS/s CMOS Discrete-Time FFT Processor for Ultra-Wideband OFDM Wireless Receivers", 2011; 12 pages.

Michael Powell et al, "Gated-Vdd—a circuit technique to reduce leakage in deep-submicron cache memories", 2000, Purdue University, School of Electrical and Computer Engineering, 6 pages.

Richard Strong et al, "Fast switching of threads between cores", ACM SIGOPS Operating Systems Review, vol. 43, Issue 2, Apr. 2009, pp. 35-45; 12 pages.

* cited by examiner

ACCELERATING THE MICROPROCESSOR CORE WAKEUP BY PREDICTIVELY EXECUTING A SUBSET OF THE POWER-UP SEQUENCE

CROSS-REFERENCE TO RELATED APPLICATION

This application is a continuation of U.S. patent application Ser. No. 14/026,472, filed Sep. 13, 2013, the disclosure of which is incorporated by reference herein in its entirety.

BACKGROUND

The present invention relates to microprocessor core wakeup, and more specifically, to pre-waking up a power gated microprocessor core by predictively executing a subset of the power-up sequence.

Power gating is a technique used in integrated circuit design to reduce power consumption, by shutting off the flow of current to blocks of the circuit that are not currently in use. Power gating also reduces stand-by or leakage power.

Power gating affects design architecture of the integrated circuit, and increases time delays, as power gated modes have to be safely entered and exited. Architectural trade-offs exist between designing for the amount of leakage power saving in low power modes and the energy dissipation to enter and exit the low power modes. Shutting down the blocks can be accomplished either by software or hardware. Driver software can schedule the power down operations, or hardware timers can be utilized. A dedicated power management controller is another option.

SUMMARY

According to an embodiment, an integrated circuit with power gating is provided. The integrated circuit includes a power header switch configured to connect and disconnect any one of a plurality of circuits to a common voltage source. A powered off circuit is disconnected from the common voltage source. The integrated circuit includes a power-up sequencer having an initial stages power-up component and a final stages power-up component. The final stages power-up component is configured to execute final stages of a power-up process for the powered off circuit, and the initial stages power-up component is configured to execute initial stages of the power-up process for the powered off circuit. The initial stages power-up component is activated in response to a predictive power-up request.

According to an embodiment, a method for an integrated circuit with power gating is provided. The method includes providing a power header switch to connect and disconnect any one of a plurality of circuits to a common voltage source. A powered off circuit is disconnected from the common voltage source. A power-up sequencer is configured to include an initial stages power-up component and a final stages power-up component. The final stages power-up component is configured to execute final stages of a power-up process for the powered off circuit. The initial stages power-up component is configured to execute initial stages of the power-up process for the powered off circuit. The initial stages power-up component is activated in response to a predictive power-up request.

According to an embodiment, a computer having power gating capability is provided. The computer includes memory configured to store data, and a processor connected to the memory. The processor is configured to execute a prepare to power-up instruction in an instruction set architecture. Executing the prepare to power-up instruction causes at least one of a completion of initial steps of a power-up sequence for a power gated core and/or a complete powering up of a subset of functionality of the power gated core. As such, when the prepare to power-up instruction is executed prior to a demand power-up request, a response time for executing the demand power-up request is reduced (as compared to when no power-up instruction is executed).

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
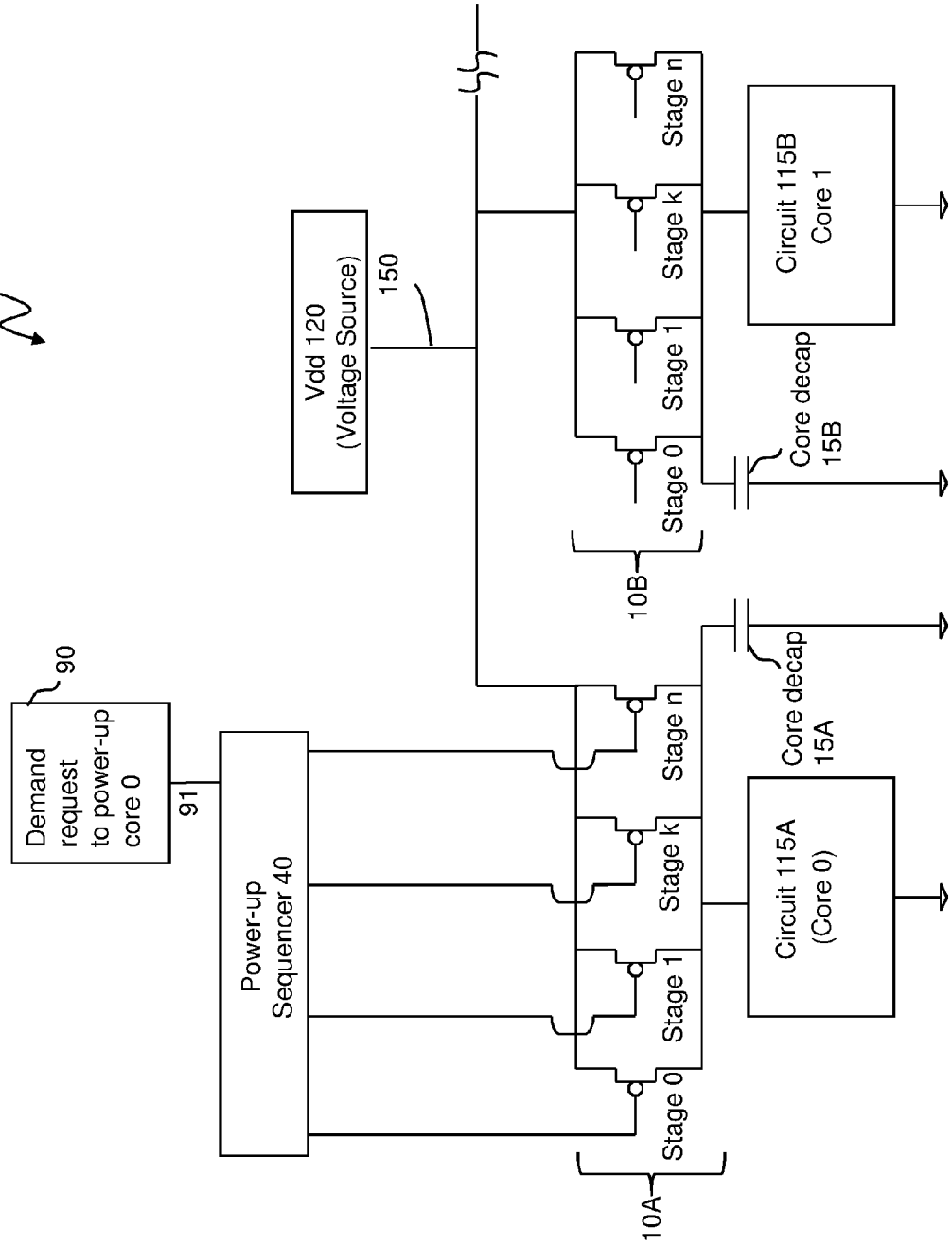
FIG. 1 illustrates a multistage multicore wakeup process of an integrated circuit.

Embodiments relate to integrated circuits and examples disclosed may be applied, for example, to a general purpose multicore processor chip (G) attached to an accelerator (off-load engine) chip A.

The issue with power gating at the large macro level (e.g. a complete core or an accelerator lane in a machine consisting of the general purpose multicore chip G, attached to the accelerator chip A) is that power gating requires significant investment in the power-up sequence of the gateable macro.

For a microprocessor, the header switch consists of multiple field effect transistor (FET) switches with an individual control turning them on or off. The control is generated by the power-up sequencer. When the core is powered up in response to a demand request, a significant amount of electrical charge is required to be supplied to the power grid of the core being powered up. Because of the high inductance path from the core power grid to the power supply, the charge cannot be supplied instantly from the power supply. Therefore, if the core is powered up too quickly the charge needed to power up the core grid is being supplied by the power grid of other running cores on the same chip. This current causes noise on the power grid of the running cores, potentially leading to the risk of a failure in one of the running cores. In order to power up a core in the state of the art, the power-up sequencer generates control signals for the sections of the header switch, turning them on in stages. Typically, a small section of the header is turned on during the first stages of the wakeup sequence in order to bring up the power grid of the core from the power-down level to a level close to the external power supply, before the next, bigger stage of the header switch is turned on. This multistage process for powering up a core leads to a significant increase in the power-up latency.

However, embodiments are able to cause an effective reduction in the core wakeup latency via a pre-wakeup technique. Embodiments reduce the latency of the core wakeup process by predictively executing a subset of the power-up sequence. In anticipation of the need to wake up a power gated core, the power-up process is executed partially. This effectively reduces the net wakeup latency. This technique has the advantage that it requires very little additional logic or added power to enable the fast wakeup. A "prepare to power-up" (PPUP) instruction can be used to enable system-programmable support for such a wakeup latency reduction; but, in the absence of such an instruction, autonomous control (i.e., a sense-and-actuate apparatus) can also be used to provide for such fast wakeup. The PPUP instruction may also be referred to as a partial power-up instruction.

As discussed herein, the term "demand request" refers to a request to turn on a power gated core in response to a condition that requires access to one or more of the functions of the power gated core. In other words, the power gated core must be switched from the gated (i.e., turned off) to the functional mode in order for the program execution to continue. The term "demand request to power-up component (90)" refers to any processor component capable of generating the demand request to power up the power gated cores in response to a program execution condition that requires access to the one or more functions of the power gated core. For example, a demand power-up request (91) occurs when a program execution cannot proceed without fully powering up the power gated core and/or any other condition when the computer system required a complete activation of the power gated entity. If a demand power up request occurs before (or without) completing the partial power-up sequence, the full power-up latency is incurred, resulting in a delay in execution, increase in the response time of the processor or any other negative impact on the performance of the computer system.

Now turning to the figures, FIG. 1 illustrates a multistage multicore wakeup process of an integrated circuit 100. State of the art integrated systems may utilize core or sub-core (accelerator lane) level power gating. That is, one or more cores (or sub-cores) on a multicore processor can be turned off (i.e., power gated) to conserve power. Also, there is the significant wakeup time for such a power gated resource (i.e., power gated core or sub-core), once it is determined that the resource is needed back as part of the available compute resources.

In FIG. 1, a common voltage source 120 is connected to header switches 10A and 10B. The common voltage source 120 may also be referred to as Vdd or common power supply.

Figure 2:
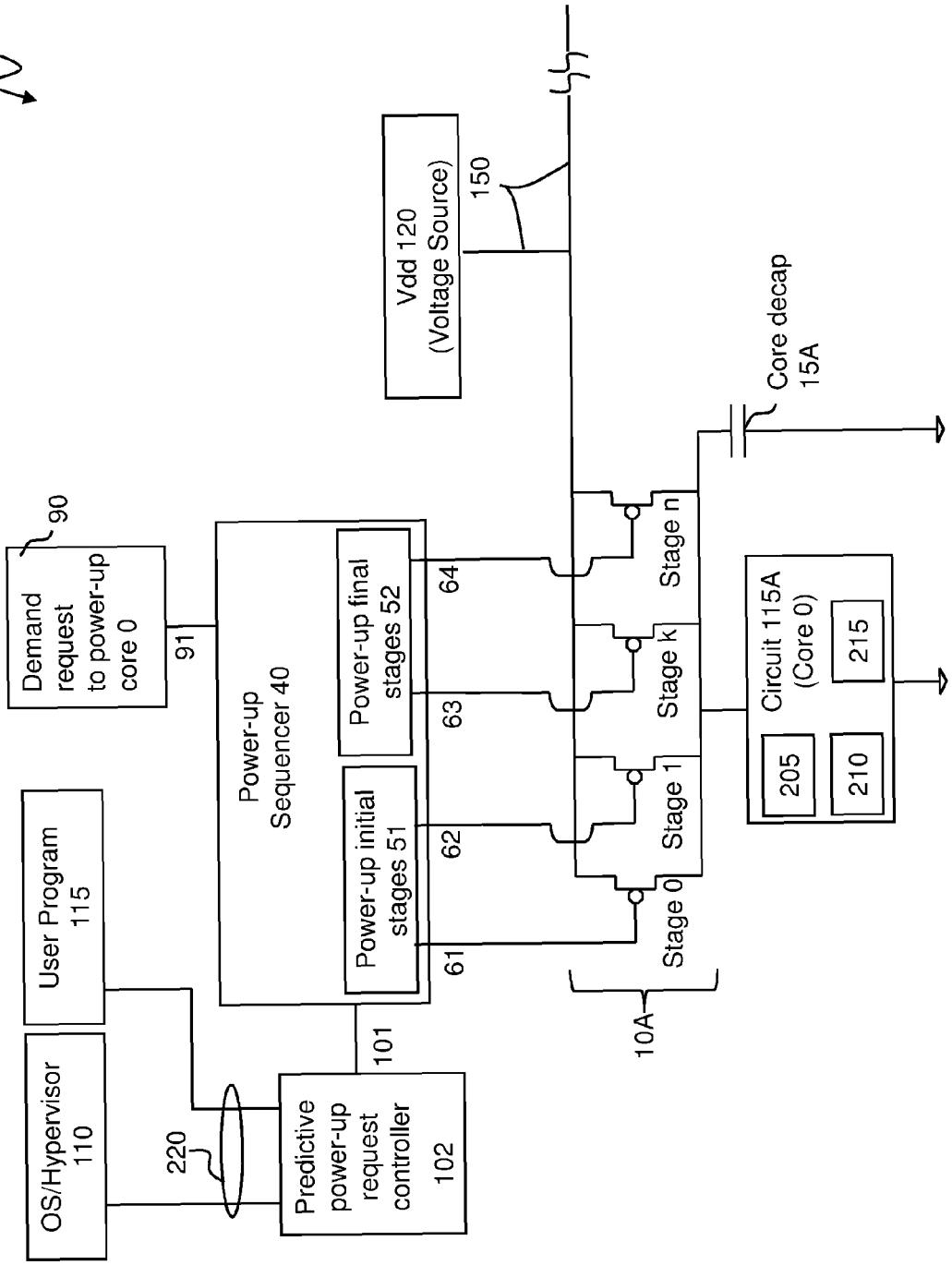
FIG. 2 illustrates a predictive mechanism to initiate a subset of the steps of the power-up sequence in the integrated circuit to reduce the latency of the power-up process according to an embodiment.
Figure 3:
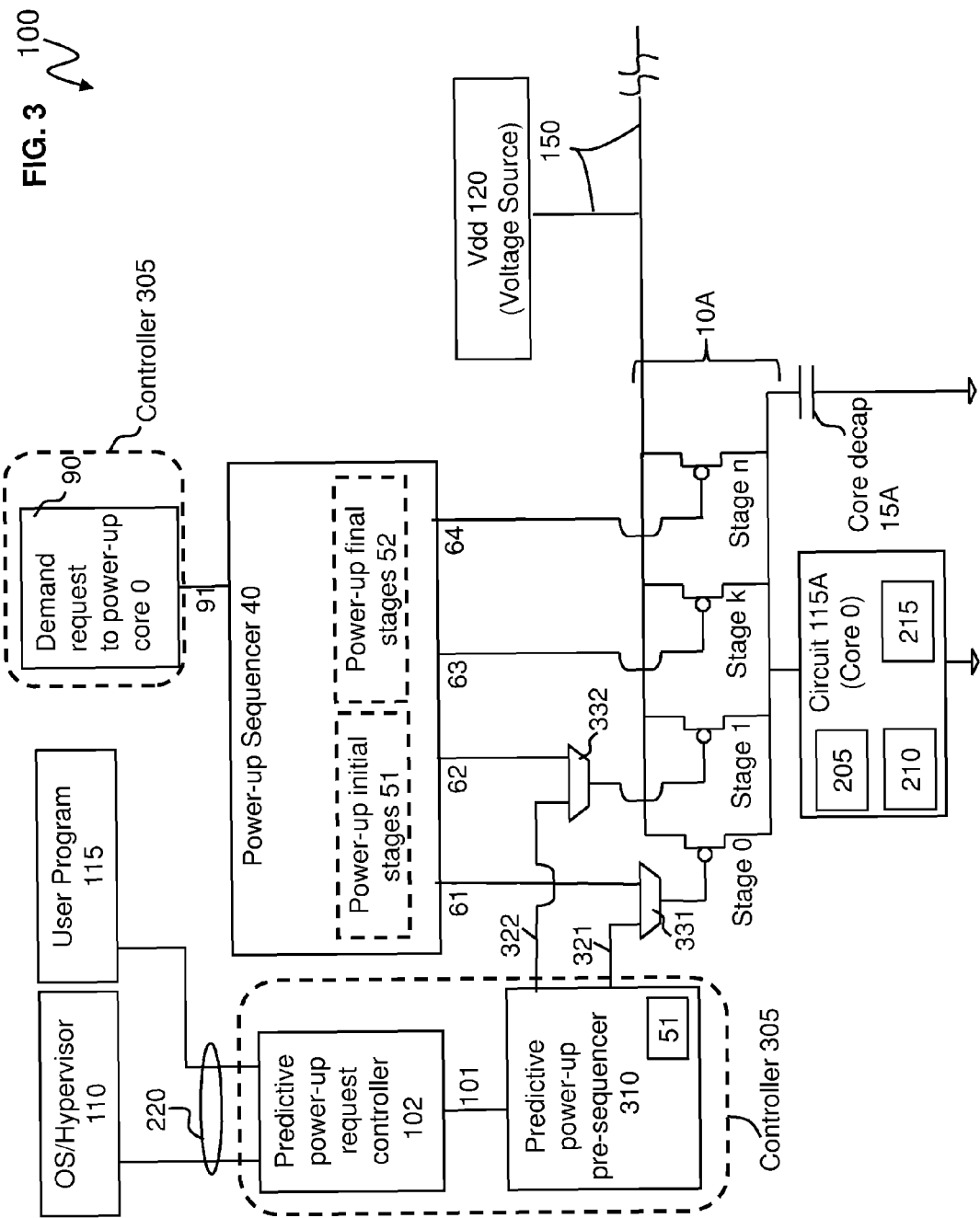
FIG. 3 illustrates another implementation of the predictive mechanism to initiate the subset of the steps of the power-up sequence in the integrated circuit to reduce the latency of the power-up process according to an embodiment.

The header switches 10A and 10B may generally be referred to as header switches 10. Also, the header switches 10A and 10B are known as power gating header devices or headers. The header switch 10A collectively includes stage 0 header transistor, stage 1 header transistor, stage k header transistor, and stage n header transistor (all of which have their respective gate terminals (or control terminals, e.g., bases in bipolar transistors, and gates in FET devices) connected a power-up sequencer 40 for receiving control signals (i.e., gate voltages) that individually turn on and turn off each respective stage 0 through stage n header transistor as shown in FIG. 1-3). The source terminals of the stage 0 through stage n header transistors are respectively connected to the voltage source 120 to supply power to circuit 115A through their respective drains (in case of bipolar devices that would be emitter/collector terminals).

Similarly, the header switch 10B collectively includes stage 0 header transistor, stage 1 header transistor, stage k header transistor, and stage n header transistor (all of which have their respective gate terminals (or control terminals, e.g., bases in bipolar transistors, and gates in FET devices) connected a power-up sequencer (although not shown) which may operate the same as power-up sequencer 40) receiving control signals (i.e., gate voltages) that individually turn on and turn off each respective stage 0 through stage n header transistor). The sources of the stage 0 through stage n header transistors are respectively connected to the voltage source 120 to supply power to circuit 115B through their respective drains. The power-up sequencer respectively connected to the stage 0 through stage n header transistors in the header switch 10B is omitted so as not to obscure the figure, but operates by analogy as discussed herein for the power-up sequencer 40.

Circuits 115A and 115B respectively may be core 0 and core 1 on a microprocessor as the integrated circuit 100. The circuits 115A and 115B are representative of circuits on any type of integrated circuit 100 such as a microprocessor. It is understood that the microprocessor is not limited to two cores, and additional cores/circuits are on the microprocessor and connectable to the common voltage source 120 as discussed herein.

Circuit 115A has decoupling capacitor 15A (core decap), and the circuit 115A may include internal capacitance. One plate of the decoupling capacitor 15A is connected to both circuit 115A and drains of stage 0 through n header transistors of header switch 10A.

Similarly, circuit 115B has decoupling capacitor 15B (core decap), and the circuit 115B may include internal capacitance. One plate of the decoupling capacitor 15B is connected to both circuit 115B and drains of stage 0 through n header transistors of header switch 10B. The decoupling capacitors 15A and 15B are designed with a charge-holding capability implemented as one or more on-chip (e.g., on the chip of the microprocessor as the integrated circuit 100) decoupling capacitors, which may be field effect transistor (FET) capacitors, deep-trench capacitors, and/or package-mounted capacitors.

The respective power-up sequencers 40 (not shown for circuit 115B) power on and/or power off the respective stage 0 through stage n header transistors in header switches 10A and 10B.

When a circuit/core is being powered up from a power gated state (e.g., after receiving a demand request (from the demand request to power-up component 90) to turn on a power gated core in response to a condition that requires access to the one or more of the functions of the gated core via control signal 91), a significant amount of electrical charge is required to be supplied to the power grid of the circuit/core being powered up. Because of the high inductance path from the global power grid 150 to the voltage source 120 (power supply), the charge cannot be supplied instantly from the voltage source 120 (power supply). Therefore, if the core 0 is powered up too quickly, the charge needed to power up the core 0 grid (individual connections of the header switch 10A) is being supplied by the power grid (individual connections of the header switch 10B) of other running cores (such as circuit 115B of core 1) on the same chip. This large draw of current causes noise on the power grid of the running cores (i.e., on the power grid header switch 10B of circuit 115B), potentially leading to the risk of a failure in one (e.g., circuit 115B) of the running cores.

As an example of computing the amount of voltage noise that could be introduced on the power grids of the running cores when one of the cores is powered up while turning on all of the power switch transistors simultaneously, consider the following scenario. The processor chip has two cores, and each core has 0.1 micro Farad (µF) of total capacitance connected to the power grid including the decoupling capacitance and the internal capacitance of the circuits. The nominal operating voltage is Vdd=1.0V and the nominal current consumption of each core is 10 amps. The total gate width of the CMOS transistors comprising the power switch is 1 meter, capable of supplying the nominal current to each core at 10 millivolts of voltage drop between the source and drain terminals of the header switch CMOS transistors. Suppose that when core 0 is power gated, the voltage at its power grid is reduced to 0.1V due to the leakage current through the circuits of core 0 to the ground. In this example, simultaneously turning on all of the power switch transistors (of core 0) will result in an initial current (draw) of 1000 A flowing through the power switch transistors into the decoupling capacitance and the internal capacitance of core 0. The electrical inductance of the chip package (e.g., the chip/integrated circuit 100) limits the rate of increase in the current flowing from the external voltage regulator into the circuit. For a package electrical inductance of 1 picoHenry (pH), the rate of current increase of 10 A per nanosecond creates a voltage drop of 10 millivolts across the package electrical inductance. Thus, because of the electrical inductance of the package the external power supply (e.g., voltage source 120) can only supply approximately 10 amps of current out of the 1000 amps (which is 1%) of current flowing through the power switch into the decoupling and internal capacitance of core 0 within the first nanosecond after turning on the power switch transistors. The remaining 99% of current is supplied by all other capacitances connected to the source terminals of the power switch transistors, including the decoupling capacitance of the running core 1 (and other running cores 5). If the total capacitances of core 0 and core 1 are equal and no other significant decoupling on-chip capacitance is connected to the net 150, then the voltage at core 1 will drop to approximately ½ vdd. If the processor chip has 20 cores connected to the same power supply net, then the voltage noise caused by turning on one of the power gated cores introduces the noise of approximately 1/20 vdd, or 50 mV. In typical microprocessor design the maximum voltage noise on the power grid that can be tolerated without impacting the operation of the running cores is in the range of 10 mV. This example clearly demonstrates that simultaneously turning on all power switch transistors of a power gated core introduces a significant level of power supply noise of the running cores, potentially leading to failures in the running cores.

In the state of the art in order to power up a core (e.g., core 0) that had been power gated, the power-up sequencer 40 sequentially generates control signals (e.g., control signals 61, 62, 63, and 64 discussed later) for the transistors of the header switch 10A, turning them on in stages. Turning on stage 0 header transistor is the first, turning on stage 1 header transistor is the second stage, turning on stage k header transistor is the third stage, and turning on stage n header transistor is the last stage, where each transistor is larger than the previous (i.e., allowing more current to flow). Typically, a small section of the header switch 10A is turned during the first stages of the wake-up sequence in order to bring up the power grid of the core from the power-down level to a level close to the external power supply (i.e., close to Vdd of voltage source 120), before the next, bigger stage of the header switch is turned on. This multistage process for powering up a core (e.g., core 0) leads to a significant increase in the power-up latency.

Further details of the latency are provided as an example of waking up circuit 115A (core 0) after having been turned off/powered down. When waking up the circuit 115A, the power-up sequencer 40 first enables the stage 0 (i.e., first) header transistor, and then waits until the introduced noise on the power grid (i.e., on connections of header switch 10B) settles. Then, the power-up sequencer 40 enables the stage 1 header transistor and then waits until the introduced noise on the power grid (i.e., on connections of header switch 10B) settles. Next, the power-up sequencer 40 enables stage k header transistor and then waits until the introduced noise on the power grid settles. Finally, the power-up sequencer 40 enables stage n (last/biggest) header transistor. These sequential steps/stages take time to walk through and so introduce latency in waking up a power gated circuit (i.e., the power gated circuit 115A).

The following example shows the typical latency of powering up a power gated core without introducing a significant amount of noise on the power grid of the running cores. In order to power-up the core the power switch transistor is partitioned into four to ten stages (note that four stages are shown in power switch transistors 10A and 10B). The total gate width of transistors in the first stage is typically set to 0.01% to 0.1% of the total gate width of the transistors of the power switch. Limiting the gate width of the transistors in the first stage to 0.1% reduces the current flowing into the decoupling capacitance of the power gated core 0 from 1000 amps in the earlier example to approximately 1 amp. This amount of current increase can be provided by the off-chip power supply within 0.1 nanosecond without exceeding the 10 mV limit on the allowed power supply noise. The total transistor sizes of the second stage of the power switch can be set to be a factor of 2× to 10× of the first stage, and so on. Thus, in order to turn on 100% of the power switch gate width, starting with 0.01% of the gate width at stage 1 and increasing the gate width by factor of 2× between every two stages, the total of 13 stages are required (computed as a base-2 logarithm of the ratio of the total gate width to the gate width of the first stage). Using a more aggressive turn-on sequence, starting with 0.01% of the gate width at stage 1 and increasing the gate width by factor of 4× between every two stages, the total of 7 stages are required (computed as a base-4 logarithm of the ratio of the total gate width to the gate width of the first stage). In order to avoid the interaction between consecutive stages in the power-up process, the turning on of any two consecutive stages must be separated by a time interval of between hundreds of nanosecond to tens of microseconds, resulting in a total wake up latency of up to hundreds of microseconds.

Figure 4:
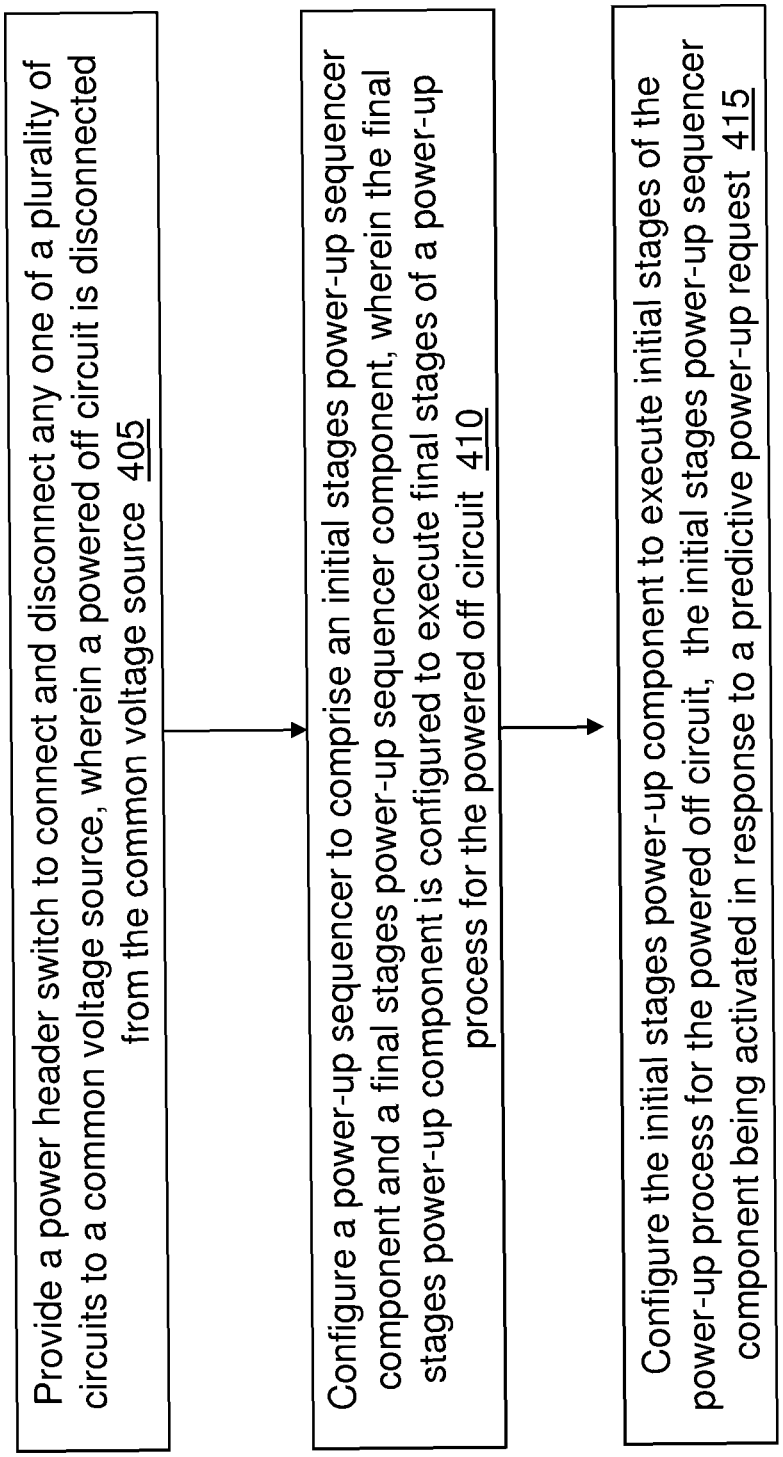
FIG. 4 illustrates a method of operating the integrated circuit with power gating according to an embodiment.

FIGS. 2, 3, and 4 illustrate modifications to the integrated circuit 100 shown in FIG. 1, according to embodiments. Embodiments provide methods and apparatuses for reducing the wakeup time of the power gated resource (core/circuit).

FIG. 2 illustrates a predictive mechanism (which should be prior to the demand request to power-up by the demand request to power-up component 90) to initiate a subset of the steps of the power-up sequence in the integrated circuit 100 to reduce the latency of the power-up process according to an embodiment.

The power-up sequencer 40 includes (is split into) a power-up initial stages component 51 and a power-up final stages component 52. The power-up initial stages component 51 is responsible for the initial stage of the power-up process which include, e.g., turning on stage 0 and stage 1 header transistors via control signals 61 and 62, respectively. The power-up final stages component 52 is responsible for the final stages of the power-up process, which include, e.g., turning on stage k through stage n header transistors via control signals 63 and 64, respectively. A predictive power-up request controller 102 is connected to the power-up sequencer 40. The predictive power-up request controller 102 is configured to generate a predictive wakeup/power-up request 101 to the power-up initial stages component 51 so that power-up initial stages component 51 provides control signals 61 and 62 to (only) power up stage 0 and stage 1 header transistors (before the demand power-up request 91 from the demand request power-up component 90 to turn on all stage 0 through stage n header transistors (sequentially)). That is, even before the power-up sequencer 40 has been instructed to wake up (i.e., fully turn on all stages 0 though n header transistors) the circuit 115A, the predictive power-up request controller 102 pre-wakes up the circuit 115A.

The activation of the power-up sequencer 40 for the initial stages (e.g., via the power-up initial stages component 51) is controlled by the predictive power-up request controller 102. Assume that the demand power-up request 91 is transmitted after the predictive power-up request 101 (generated by the predictive power-up request controller 102) has been transmitted to the power-up sequencer 40. In this case, the initial stages of the power-up sequence are complete (i.e., stage 0 through stage 1 header transistors of header switch 10A have been preemptively/predictively turned on by the predictive power-up request 101 of the predictive power-up request controller 102). Accordingly, when the demand power-up request 91 is (later) received by the power-up sequencer 40 to wake up the circuit 115A, the latency of the wakeup process is reduced as the time to power on stage 0 through stage 1 header transistors is removed because stage 0 through stage 1 header transistors of header switch 10A have previously been turned on via the predictive power-up request 101 of the predictive power-up request controller 102.

The circuit 115A (i.e., microprocessor core) includes an array 205 of memory cells which are devices for storing data/bits (e.g., zeros and ones). The circuit 115A may include an automatic built-in self test (ABIST) circuit 210. The automatic built-in self test circuit 210 runs integrated circuit (internal chip) 100 diagnostics as part of the system boot process. The ABIST circuit 210 tests the logic and arrays 205 in each chip (as applicable) and performs array 210 repair (bit sparing) for processor chips, if necessary. The circuit 115A includes other circuitry 215 which are units that read and execute program instructions (i.e., threads) as understood by one skilled in the art.

The predictive power-up request controller 102 is configured to send the control signal 101 to the power-up initial stages component 51, which causes the power-up initial stages component 51 to pre-wakeup (pre-turn on) the array 205 of memory cells and/or the ABIST circuit 210 in the circuit 115A (core 0) without waking up (i.e., turning on) the entire circuit 115A. This predictive power-up request 101 (only) wakes up partial functionality of the circuit 115A (before the demand power-up request 91 is received by the power-up sequencer 40 to wake up the entire circuit 115A) in predictive anticipation of a subsequent demand power-up request 91 from the demand request to power-up component 90. Pre-wakeup (pre-turn on) of the array 205 of memory cells and/or the ABIST circuit 210 reduces the latency in the power-up sequence for the normal wakeup.

FIG. 2 also illustrates an operating system (OS) and/or hypervisor 110 along with a user program 115 connected to the predictive power-up request controller 102. In one implementation, the OS/hypervisor 110 and the user program 115 are configured to send a prepare for power-up (PPUP) instruction 220 to the predictive power-up request controller 102, which in turn causes the predictive power-up request controller 102 to send the predictive power-up request 101 to the power-up initial stages component 51.

The prepare for power-up (PPUP) instruction 220 is defined as a new privileged instruction in the instruction set architecture (ISA) run on the integrated circuit 100. The PPUP instruction 220 can be scheduled (e.g., generated and issued) by the OS/hypervisor 110 and/or the user program 115, and the PPUP instruction 220 indicates an anticipated wakeup (i.e., pre-wakeup) of the currently gated resource (e.g., the circuit 115A). Via issuance of the PPUP instruction 220, the power-up sequence is partially executed thereby reducing the latency of the full power-up sequence when the need for core activity arises.

The predictive power-up request controller 102 is configured to deny the request of the PPUP instruction 220 when the predictive power-up request controller 102 determines that the voltage source 120 would exceed its power (voltage) limitation if the PPUP instruction 220 were executed.

As another implementation, FIG. 3 illustrates a predictive mechanism (which should be prior to the demand request to power-up by the demand request to power-up component 90) to initiate a subset of the steps of the power-up sequence in the integrated circuit 100 to reduce the latency of the power-up process according to an embodiment.

As discussed herein in FIG. 2, FIG. 3 provides predictive wakeup of the initial stages of the header switch 10A. However, the functionality of the power-up initial stages component 51 is implemented in a predictive power-up pre-sequencer 310 and is shown as box 51. Accordingly, the separate power-up initial stages component 51 and the power-up final stages component 52 (both shown with dashed lines in FIG. 3) may be removed from the power-up sequencer 40, and the power-up sequencer 40 can operate normally. That is, the state of the art design for the power-up sequencer 40 can be utilized and the pre-wakeup of the initial stages of the power-up sequence (i.e., stage 0 through stage 1 header transistors) can be implemented by the predictive power-up pre-sequencer 310, multiplexor 331, and multiplexor 332 along with the predictive power-up request controller 102. In this case, no modification is needed to legacy power-up sequencers. In another case, the separate power-up initial stages component 51 and the power-up final stages component 52 may be included in the power-up sequencer 40 for redundancy.

An example scenario is provided for explanation purposes. The predictive power-up request controller 102 generates and sends the predictive power-up (wakeup) request 101 to the predictive power-up pre-sequencer 310. In response to receiving the predictive power-up request 101, the predictive power-up pre-sequencer 310 generates and sends control signal 321 to multiplexor 331 in order to turn on stage 0 header transistor and generates and sends control signal 322 to multiplexor 332 in order to turn on stage 1 header transistor. The multiplexors 331 and 332 are capable of selection between the power-up sequencer 40 and the predictive power-up pre-sequencer 310. The multiplexors 331 and 332 select the respective control signals 321 and 322 (when present) to turn on the stage 0 through stage 1 header transistors in order to pre-wake up (partially functionality of) the circuit 115A.

When the demand power-up request 91 is transmitted after the control signals 321 and 322 (caused by the predictive power-up request 101) to the multiplexors 331 and 332, the initial stages of the power-up sequence are complete (i.e., stage 0 through stage 1 header transistors of header switch 10A have been preemptively turned on by the predictive power-up request 101). At this point, when the demand power-up request 91 is received by the power-up sequencer 40 to wake up the circuit 115A, the latency of the wakeup process is reduced as the time to power on stage 0 through stage 1 has been removed because stage 0 through stage 1 header transistors of header switch 10A have already been turned on via the predictive power-up request 101 of the predictive power-up request controller 102.

The predictive power-up request controller 102, the predictive power-up pre-sequencer 310, and/or the demand request power-up component 90 may all be implemented in a controller 305.

The controller 305 (the predictive power-up request controller 102 and/or the predictive power-up pre-sequencer 310) may be a hardware device and/or software application which contains (and/or receives) domain-specific predictive control logic that orchestrates the initial stages (e.g., pre-wakeup of circuit 115A) of the power-up sequence by turning on stage 0 through stage 1 header transistors.

Similarly, OS/hypervisor 110 and the user program 115 are software applications which contain (and/or receive) domain-specific predictive control logic that orchestrates the initial stages (e.g., pre-wakeup of circuit 115A) of the power-up sequence by turning on stage 0 through stage 1 header transistors.

The controller 305, the predictive power-up request controller 102, the predictive power-up pre-sequencer 310, the power-up sequencer 40, and/or the components 51 and 52 may be implemented as or include discrete logic circuits having logic gates for implementing logic functions, an application specific integrated circuit (ASIC) having appropriate combinational logic gates, programmable gate arrays (PGA), a field programmable gate array (FPGA), etc., to function as discussed herein.

The predictive power-up request controller 102 (controller 305) includes (and/or is connected to another circuit) predictive logic (which can be hardware logic circuits and/or software implementing logic) that determines (in advance) when a circuit (e.g., circuits 115A and/or 115B) is to be or should be pre-waken up to (only) turn on the initial stages (i.e., stage 0 through stage k header transistors); similarly, the OS/hypervisor 110 and/or the user program 115 may include the predictive logic that determines (in advance) when a circuit (e.g., circuits 115A and/or 115B) is to be or should be pre-waken up to (only) turn on the initial stages (i.e., stage 0 through stage k header transistors). This determination to pre-wake up the circuit, such as the circuit 115A, may be based on past utilization history of the integrated circuit (microprocessor) 100, based on the current state of N circuits/cores of the microprocessor, based on when utilization of the circuits/cores of the microprocessor is high, based on knowledge of the operating system scheduling queue (i.e., scheduling of threads for the circuits/cores of the microprocessor), and/or based on the length of time in which the circuit has already been turned off. It is understood that additional information may be utilized to predict that the power gated circuit/core needs to pre-wake up (i.e., turn on the initial stages of the power-up sequence which are stage 0 through stage k header transistors) in anticipation of waking up the power gated circuit/core. As mentioned above, a notable feature in embodiments is the PPUP instruction implemented in the instruction set architecture which offers flexibility to the privileged software (e.g., executing in the computer 600) to initiate the predictive power-on process using any algorithm available. The effect of executing the PPUP instruction is the completion of the initial stages of the power up process, and/or the powering up of a subset of the functional components of the powered off entity as has been discussed herein. Note that various examples have been provided with regard to circuit 115A (core) of the integrated circuit. By analogy, the same description applies to circuit 115B (core 1) and additional circuits (cores) (not shown for simplicity) connected to the voltage supply 120 on power grid 150.

Now turning to FIG. 4, a method 400 is illustrated for operating the integrated circuit 100 with power gating according to an embodiment. Reference can be made to FIGS. 1-3 (along with FIGS. 5 and 6 discussed below).

At block 405, the power header switch (such as, e.g., power header switches 10A and 10B) is configured to connect and disconnect any one of a plurality of circuits 115A and 115B to the common voltage source 120 (according to control signals 61, 62, 63, and/or 64 from the power-up sequencer 40), and a powered off/power gated circuit (e.g., circuit 115A) is disconnected from the common voltage source 120.

At block 410, the power-up sequencer 40 comprises the initial stages power-up sequencer component 51 and the final stages power-up sequencer component 52 in which the final stages power-up component 52 is configured to execute final stages of a power-up process for the powered off circuit 115A.

At block 415, the initial stages power-up component 51 is configured to execute initial stages (e.g., turn on stage 0 through stage 1 header transistors in header switch 10A) of the power-up process for the powered off circuit 115A, where the initial stages power-up sequencer component 51 is activated in response to the predictive power-up request 101 (from the predictive power-up request controller 102).

The initial stages power-up component 51 is configured to provide a partial wakeup of the powered off circuit 115A. The initial stages power-up component 51 is configured to turn on partial functionality of the powered off circuit 115A. The powered off circuit comprises the array 205 of memory cells, the automatic built-in self test circuit 210, and other circuitry 215 that reads and executes program instructions, and the partial functionality turned on by the initial stages power-up component 51 includes powering up the array 205 of memory cells and/or powering up the automatic built-in self test circuit 210.

The power header switch 10A comprises initial stages through last stages of header transistors (i.e., stage 0 through stage n header transistors) connectable to the powered off circuit 115A. The initial stages power-up component 51 is configured to turn on the initial stages of the header transistors (e.g., turn on stage 0 through stage 1 header transistors) for the powered off circuit 115A without turning on the last stages of the header transistors (e.g., stage k through stage n header transistors) all of which is in advance to the demand request to power-up 91 the powered off circuit 115A. The demand request to power-up 91 the powered off circuit 115A is to fully power up the powered off circuit 115A by turning on all the initial stages through the last stages of the header transistors in a sequential power-up process (i.e., turning on stage 0 through stage n header transistors with the wait time before turning on each subsequent transistor).

The predictive power-up request 101 predictively turns on (e.g., causes the power-up initial stages component 51 and/or the predictive power-up pre-sequencer 310 to turn on) the initial stages of the header transistors for the powered off circuit without knowledge of and prior to the demand request to power-up 91 fully the powered off circuit 115A. For example, the predictive power-up request controller 102 may not or does not know that the demand request to power-up component 90 is going to send the demand request to power-up signal 91, but the predictive power-up request controller 102 predictively anticipates the demand request to power-up signal 91.

Figure 5:
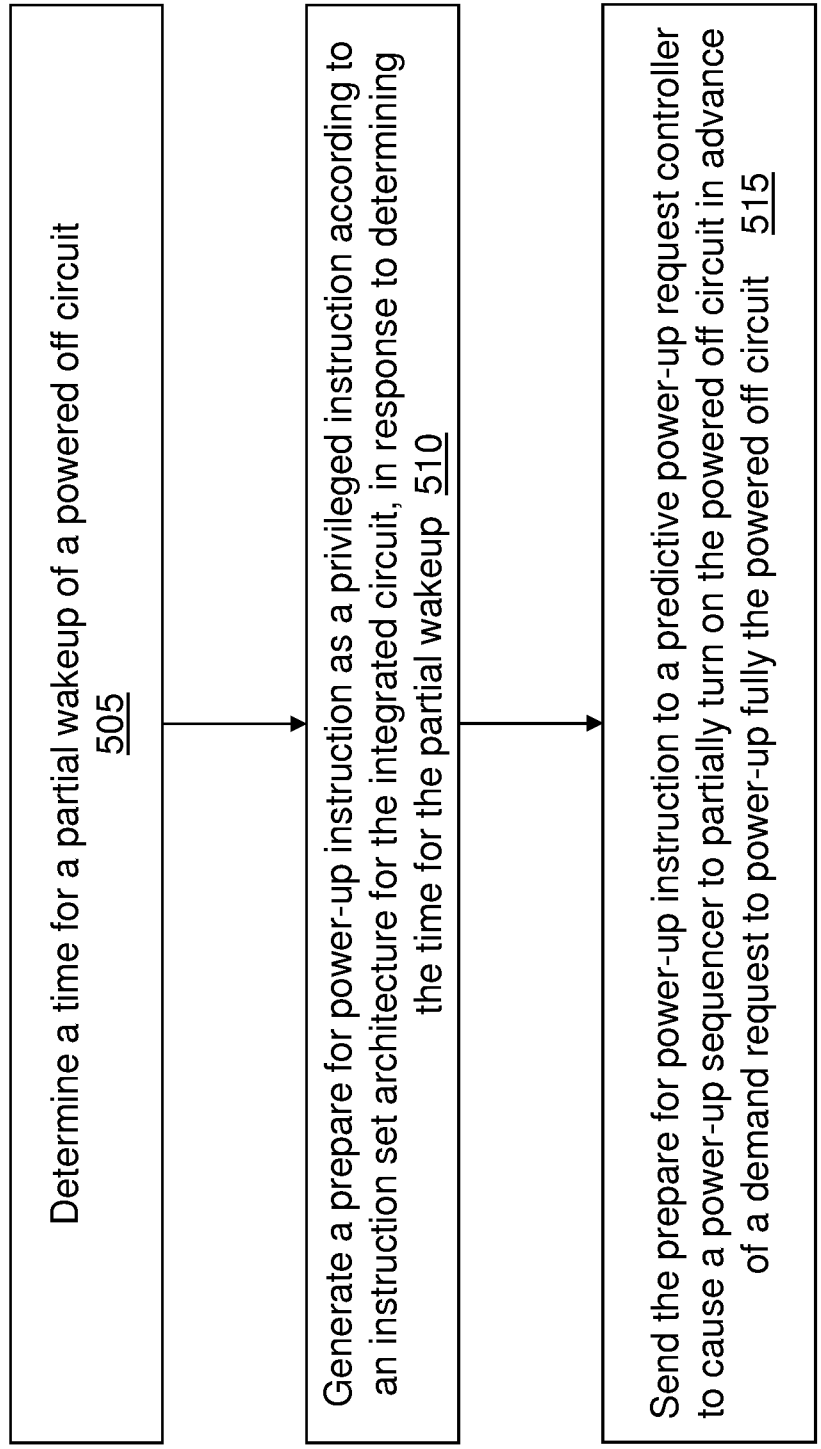
FIG. 5 illustrates a method of operating the integrated circuit with power gating according to an embodiment.

Turning to FIG. 5, a method 500 is illustrated for operating the integrated circuit 100 with power gating according to an embodiment. Reference can be made to FIGS. 1-4 (along with FIG. 6 discussed below).

The OS/hypervisor 110 and/or user program 115 (both executing on a running processor such as circuit 115B (core 1) and/or another running core) are configured to determining a time for a partial wakeup of the powered off circuit 115A (core 0) at block 505.

At block 510, the OS/hypervisor 110 and/or user program 115 are configured to generate the prepare for power-up instruction (PPUP) 220 as a privileged instruction according to an instruction set architecture for the integrated circuit 100, in response to determining the time for the partial wakeup.

The OS/hypervisor 110 and/or user program 115 are configured to send the prepare for power-up instruction 220 to the predictive power-up request controller 102 to cause the power-up sequencer 40 to partially turn on the powered off circuit 115A in advance of the demand request to power-up 91 fully the powered off circuit 115A at block 515.

The prepare for power-up instruction 220 causes partially functionality of the powered off circuit 115A to turn on. The powered off circuit 115A comprises an array 205 of memory cells, an automatic built-in self test circuit 210, and other circuitry 215 that reads and executes program instructions. The partial functionality turned on by the prepare for power-up instruction 220 includes at least one of powering up the array 205 of memory cells and powering up the automatic built-in self test circuit 210.

Figure 6:
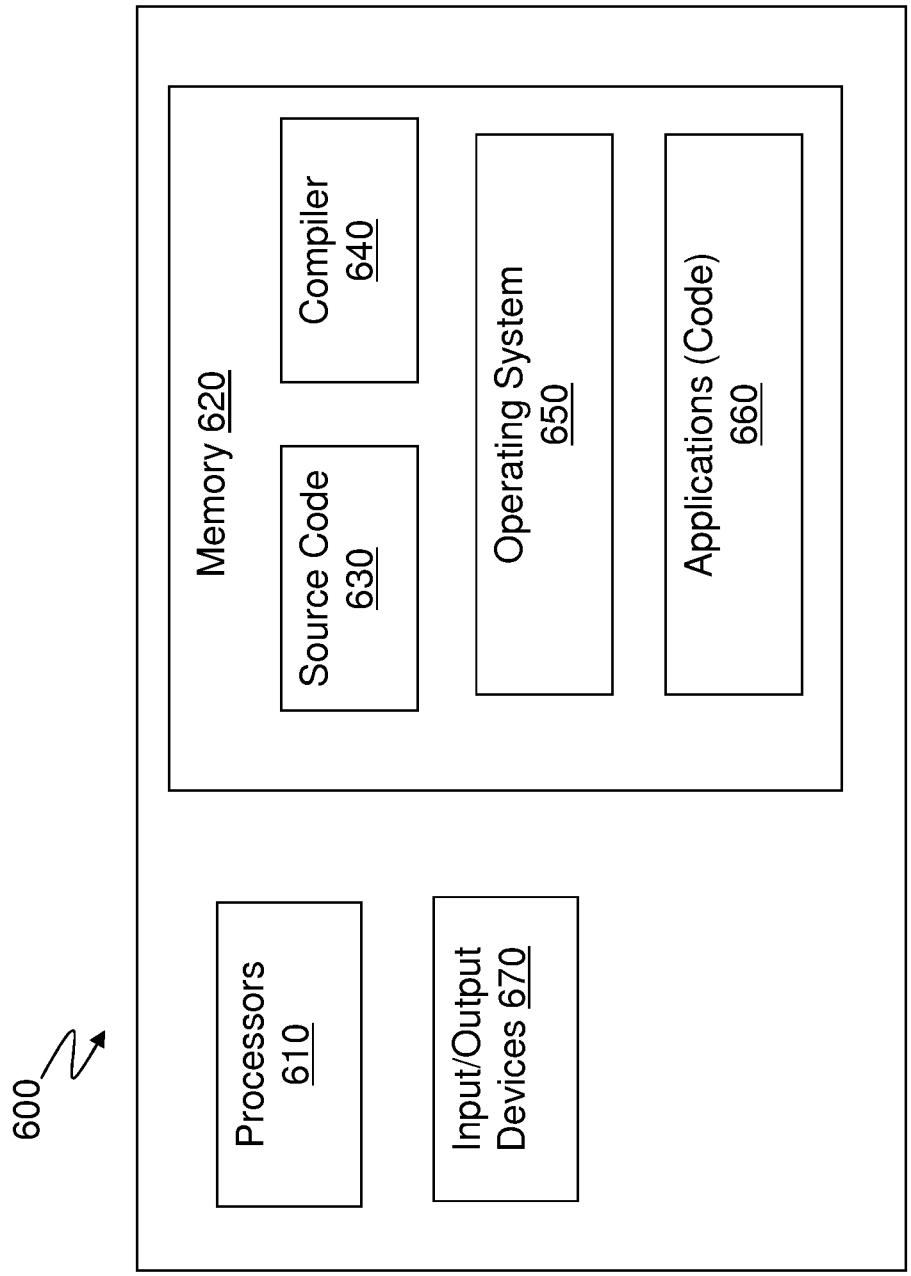
FIG. 6 is a block diagram that illustrates an example of a computer or system (computer setup) having capabilities, which may be included in and/or combined with embodiments.

Now turning to FIG. 6, an example illustrates a computer 600 (e.g., any type of computer system that includes and/or operates one or more integrated circuits 100) that has the power gating capability to implement features discussed herein. The computer 600 may be a distributed computer system over more than one computer. Various methods, procedures, modules, flow diagrams, tools, applications, circuits, elements, and techniques discussed herein may also incorporate and/or utilize the capabilities of the computer 600. Indeed, capabilities of the computer 600 may be utilized to implement features of exemplary embodiments discussed herein.

Generally, in terms of hardware architecture, the computer 600 may include one or more processors 610, computer readable storage memory 620, and one or more input and/or output (I/O) devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a data signal processor (DSP), or an auxiliary processor among several processors associated with the computer 600, and the processor 610 may be a semiconductor based microprocessor (in the form of a microchip) or a macroprocessor.

The computer readable memory 620 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor(s) 610.

The software in the computer readable memory 620 may include one or more separate programs, each of which comprises an ordered listing of executable instructions for implementing logical functions. The software in the memory 620 includes a suitable operating system (O/S) 650, compiler 640, source code 630, and one or more applications 660 of the exemplary embodiments. As illustrated, the application 660 comprises numerous functional components for implementing the features, processes, methods, functions, and operations of the exemplary embodiments.

The operating system 650 may control the execution of other computer programs, and provides scheduling, input-output control, file and data management, memory management, and communication control and related services.

The application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the O/S 650. Furthermore, the application 660 can be written as (a) an object oriented programming language, which has classes of data and methods, or (b) a procedure programming language, which has routines, subroutines, and/or functions.

The I/O devices 670 may include input devices (or peripherals) such as, for example but not limited to, a mouse, keyboard, scanner, microphone, camera, etc. Furthermore, the I/O devices 670 may also include output devices (or peripherals), for example but not limited to, a printer, display, etc. Finally, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 also include components for communicating over various networks, such as the Internet or an intranet. The I/O devices 670 may be connected to and/or communicate with the processor 610 utilizing Bluetooth connections and cables (via, e.g., Universal Serial Bus (USB) ports, serial ports, parallel ports, FireWire, HDMI (High-Definition Multimedia Interface), etc.).

In exemplary embodiments, where the application 660 is implemented in hardware, the application 660 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for an integrated circuit with power gating, the method comprising:
    providing a power header switch to connect and disconnect any one of a plurality of circuits to a common voltage source, wherein a powered off circuit is disconnected from the common voltage source;
    configuring a power-up sequencer to comprise an initial stages power-up component and a final stages power-up component, wherein the final stages power-up component is configured to execute final stages of a power-up process for the powered off circuit; and
    configuring the initial stages power-up component to execute initial stages of the power-up process for the powered off circuit, the initial stages power-up component being activated in response to a predictive power-up request.

2. The method of claim 1, further comprising configuring the initial stages power-up component to provide a partial wakeup of the powered off circuit.

3. The method of claim 1, further comprising configuring the initial stages power-up component to turn on partial functionality of the powered off circuit.

4. The method of claim 3, wherein the powered off circuit comprises an array of memory cells, an automatic built-in self test circuit, and other circuitry that reads and executes program instructions; and
    wherein the partial functionality turned on by the initial stages power-up component includes at least one of powering up the array of memory cells and powering up the automatic built-in self test circuit.

5. The method of claim 1, wherein the power header switch comprises initial stages through last stages of header transistors connectable to the powered off circuit.

6. The method of claim 5, wherein the initial stages power-up component is configured to turn on the initial stages of the header transistors for the powered off circuit without turning on the last stages of the header transistors all of which is in advance to a demand request to power-up the powered off circuit.

7. The method of claim 6, wherein the demand request to power-up the powered off circuit is to fully power up the powered off circuit by turning on all the initial stages through the last stages of the header transistors in a sequential power-up process.

8. The method of claim 5, wherein the predictive power-up request predictively turns on the initial stages of the header transistors for the powered off circuit without knowledge of and prior to a demand request to power-up fully the powered off circuit.

* * * * *